United States Patent [19]

Terada et al.

[11] Patent Number: 5,542,982
[45] Date of Patent: Aug. 6, 1996

[54] METHOD OF REMOVING COATING FILMS

[75] Inventors: Masahiro Terada; Hirosuke Kamae, both of Kanagawa; Motoyasu Yusawa, Chiba; Kazuyuki Watanabe, Chiba; Mitsuo Saito, Chiba, all of Japan

[73] Assignees: Nissan Motor Co., Ltd., Kanagawa; Mitsui Petrochemical Industries, Ltd., Tokyo, both of Japan

[21] Appl. No.: 383,675

[22] Filed: Feb. 1, 1995

Related U.S. Application Data

[63] Continuation of Ser. No. 123,120, Sep. 20, 1993, abandoned.

[30] Foreign Application Priority Data

Sep. 25, 1992 [JP] Japan .................... 4-256457

[51] Int. Cl.$^6$ .............. B08B 3/08; B08B 3/10; B08B 7/00
[52] U.S. Cl. ............ 134/5; 134/6; 134/7; 134/10; 134/19; 134/38
[58] Field of Search .................. 134/2, 5, 6, 7, 134/10, 19, 38, 6; 252/79.5

[56] References Cited

U.S. PATENT DOCUMENTS

| | | | |
|---|---|---|---|
| 2,917,418 | 12/1959 | Cathcart | 134/22.1 |
| 4,287,689 | 9/1981 | Mindel et al. | 51/320 |
| 4,324,705 | 4/1982 | Seto et al. | 134/10 |
| 4,549,374 | 10/1985 | Basi et al. | 51/308 |
| 5,055,139 | 10/1991 | Personette | 134/22.17 |
| 5,127,958 | 7/1992 | Personette | 134/2 |
| 5,266,088 | 11/1993 | Sandusky et al. | 51/298 |
| 5,269,820 | 12/1993 | Fujii et al. | 51/293 |
| 5,304,252 | 4/1994 | Condra et al. | 134/2 |

FOREIGN PATENT DOCUMENTS

| | | |
|---|---|---|
| 0215474 | 3/1987 | European Pat. Off. . |
| 0109925 | 8/1975 | Japan . |
| 51-34238 | 9/1976 | Japan . |
| 57-76065 | 5/1982 | Japan . |
| 9117567 | 7/1984 | Japan . |
| 9131674 | 7/1984 | Japan . |
| 61-162568 | 7/1986 | Japan . |
| 1162568 | 7/1986 | Japan . |
| 1289878 | 11/1989 | Japan . |
| 2274775 | 11/1990 | Japan . |
| 59420 | 1/1993 | Japan . |
| 9200847 | 1/1993 | WIPO . |

OTHER PUBLICATIONS

UK Search Report.

*Primary Examiner*—Zeinab El-Arini
*Attorney, Agent, or Firm*—Birch, Stewart, Kolasch & Birch, LLP

[57] ABSTRACT

Improved methods of removing coating films from resin substrates includes first treating the resin substrates in an aqueous alkali solution with a concentration of 0.1 wt % or more at a temperature of 110° C. or more, which temperature is lower than the melting point of the substrates and then polishing the surfaces of the substrates by either bringing them into contact with each other in suitable equipment such as a screw feeder, or using an abrasive in suitable equipment such as a high-speed vessel type stirrer, or subjecting the substrates to a liquid honing process.

10 Claims, 1 Drawing Sheet

METHOD OF REMOVING COATING FILMS

This application is a continuation of application Ser. No. 08/123,120 filed on Sep. 20, 1993, now abandoned.

BACKGROUND OF THE INVENTION

1. Field of the Invention

This invention relates to a method of removing coating films, more particularly, to a method by which coating films on resin substrates are first treated with alkalies to be rendered easily strippable and then subjected to specified polishing treatments so as to remove the coating films from the surfaces of the resin substrates, whereby they are reverted to resin materials that can be recycled to industrial uses including the one to which they were initially put to.

2. Discussion of Related Art

Compared to metal and glass products, shaped resin parts are not only lightweight and superior in impact resistance but also inexpensive and easy to work by shaping. Because of these advantages shaped resin parts are currently used in automobiles, home electric appliances, daily sundries and many other areas. In particular, for the purpose of reducing the body weights, the number of resinous parts used in automotive bodies has been increasing.

Most of such resin products are coated in order to improve not only their resistance to bruise and weather but also their aesthetic appearance. To insure strong adhesion to the shaped resin parts and to produce coating films of high performance, the paints for coating are mostly made of materials capable of forming three-dimensional crosslinked structures. However, because of this excellent coating performance, the films having strong crosslinked structures cannot be easily stripped even if there is some reason to strip them after once formed by coating.

The removal of coating films is industrially an important technology since it is required on many occasions such as where defects have occurred in the coating process, where the old coating film with deteriorated performance has to be replaced by a new one and where there is a need to reuse only the resin substrates of the coated shaped resin parts. The heretofore practiced methods of stripping and removing coating films are roughly divided into physical and chemical means. The physical stripping is a method in which the coating films are scraped off with sand paper or the like. The chemical stripping is a generally classified into the following three methods:

1) removal with strippers that are based on chlorine-containing solvents (Japanese Patent Publication (kokoku) Nos. Sho 51-34238, 57-76065 and 59-117567);
2) removal with strippers that are based on organic materials (Japanese Patent Application (kokai) Nos. Sho 50-109925, Hei 1-289878 and Hei 2-274775); and
3) removal with strippers that are based on inorganic materials (Japanese Patent Application (kokai) Nos. Sho 50-109925, 59-131674 and 61-162568).

In other methods, the coating films are removed by means of strippers in which the main components of the three strippers mentioned above are mixed in suitable proportions either with themselves or with other components.

However, depending on the kind, thickness and other factors of the coating film to be removed, the above-mentioned prior art methods have sometimes failed to achieve complete removal of the coating films. In certain cases, there is a need to recycle the resin product to the same use after it has been stripped of the coating film but, if its removal is incomplete, the physical properties and the like of the product will deteriorate.

SUMMARY OF THE INVENTION

The present invention has been accomplished under these circumstances and has as an object of providing a method by which coating films on the surfaces of resin products or the like are sufficiently removed to prevent the deterioration in the physical properties of the resin of interest, thereby reclaiming it as a recyclable resin.

This object of the present invention can be attained by a method in which resin substrates, having a coating film on the surface, are (1) treated in an aqueous alkali solution with a concentration of 0.1 wt % or more at a temperature of 110° C. or more which is lower than the melting point of the substrates and, thereafter, the surfaces of the substrates are (2) polished by either bringing them into contact with each other or using an abrasive or subjecting them to a liquid honing process.

In a preferred embodiment, the polishing process is performed in a polishing machine of the screw feeder type with the substrates being held at a temperature from 30°–110° C., lower than the melting point of the substrates, for example, at a temperature of 60°–110° C. with a shearing energy being created at a value of at least 0.2 kW per kg of the substrate resin.

In another preferred embodiment, the polishing treatment is performed in a polishing machine of the high-speed vessel equipped stirrer type, as the substrates are mixed while stirring with abrasive quartz sand and a liquid vehicle such as water at a temperature of 70°–120° C. with the temperature in the vessel of the polishing machine being maintained at from 80°–100° C. during operation.

In still another preferred embodiment, the polishing process is by liquid honing using a polishing solution that has an alumina powder of 80–200 mesh dispersed in water 2–5 times the volume of the alumina powder, with the polishing solution being propelled at a pressure of 2–3 kg/cm$^2$.

In yet another preferred embodiment, the aqueous alkali solution comprises NaOH or KOH and has a concentration of 0.2–4 wt %, with the substrates being immersed in the aqueous alkali solution at a temperature that is lower than the melting point of the substrates but higher than 140° C. for example at a temperature of 150°–170° C.

In still another preferred embodiment, the coating film is based or provided on a thermosetting or thermoplastic resin or comprises a mixture of these resins or a laminate thereof, with the thermosetting resin being preferably based on an alkyd, acrylic or polyester based resin.

DETAILED DESCRIPTION OF THE INVENTION

Figure 1:
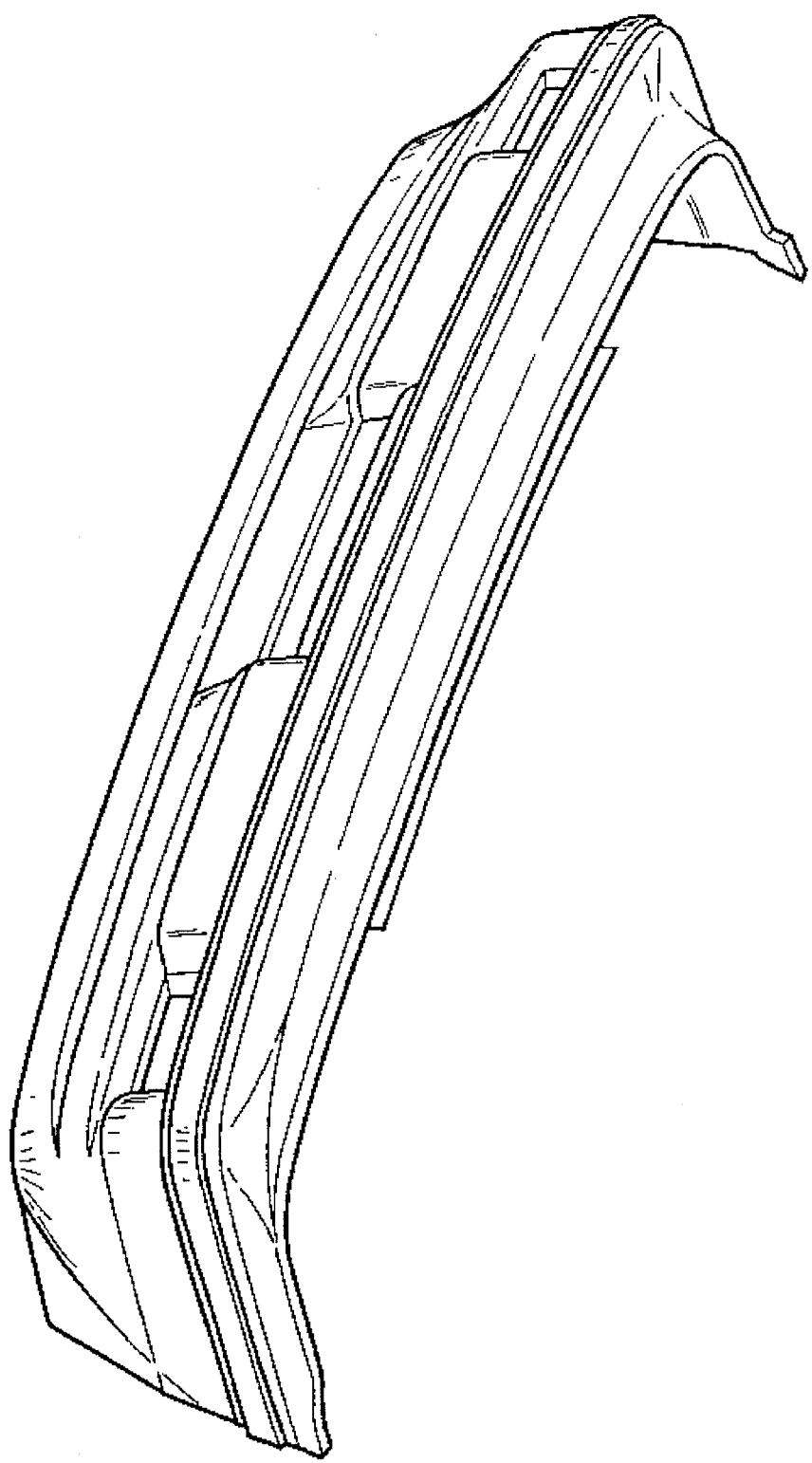
FIG. 1 is a perspective view of the bumper used in evaluating the effectiveness of the method of the present invention.

The method of the present invention for removing coating films (which is hereunder sometimes referred to as "the method of the present invention") is described below in detail.

The method of the present invention is intended for removing coating films formed on the surfaces of resin substrates. The resin substrates to be stripped of the coating films are in no way limited and may be made of any material. They also embrace resin substrates that are reinforced by filling with glass fibers, carbon fibers or inorganic powders. The method of the present invention will prove particularly effective in the case where it is used to remove coating films from the surfaces of polyolefinic substrates. Among the polyolefinic substrates, those which are shaped from polypropylene are especially suitable for treatment by the method of the present invention since polypropylene has the highest melting point of all polyolefins and thus permits effective alkali treatments to be conducted at higher temperatures.

The shape of the substrates to which the method of the present invention is to be applied is not limited in any particular way. As far as the step of stripping by treatment in the aqueous alkali solution is concerned, the preferred shape is a crushed or other particulate powder since they have an increased area of contact between the stripping solution and the coating film. These powders have preferably particle sizes in the range from about 0.5 to about 20 mm.

The method of the present invention is effective in removing the coating films, especially those which are curable, that are formed on the surfaces of resin substrates. Examples of the cured coating films that can be stripped by the method of the present invention include those films which are formed by curing the applied films of paints, such as phenolic, polyester, alkyd, acrylic, polyurethane and epoxy based paints. The method of the present invention is particularly advantageous when it is used to strip cured automotive coating films made of polyester urethanes, polyester melamines, acrylic urethanes, acrylic melamines, and so forth.

The cured coating films may be formed on the surfaces of resin substrates either directly or via a primer layer. The primer is not limited in any particular way and may be of any type that is commonly used to form cured coating films on the surfaces of resin substrates of the types contemplated by the present invention. If necessary, the resin substrates may be subjected to surface treatments such as plasma treatment, flame treatment and water blasting in order to improve the adhesion to the cured coating films.

The method of the present invention is also effective in removing the multi-layered coating films that were formed from various paints. The thickness of the coating films to be removed is in no way limited but in terms of cured coating films, the preferred thickness is 200 µm and below, more preferably 10–100 µm, with the range 30–40 µm being most preferred.

The aqueous stripping solution to be used in the method of the present invention is an aqueous solution containing an alkaline substance. The alkaline substance is in no way limited but may be exemplified by inorganics such as LiOH, NaOH, KOH, $Mg(OH)_2$ and $Ca(OH)_2$. These compounds may be used either alone or in combination. The preferred examples are NaOH and KOH, with NaOH being particularly preferred.

The concentration of the alkaline substance in the aqueous stripping solution should be at least 0.1 wt %, preferably in the range 0.1–5 wt %, more preferably in the range 0.2–4 wt %. Concentrations within these ranges are sufficient to achieve complete stripping of the coating films. On the other hand, they are low enough alkali concentrations to minimize the hazard during handling and facilitate the disposal of liquid wastes.

Besides the alkaline substances mentioned above, the aqueous stripping solution may also contain other ingredients as required. For example, a surfactant, ammonia, an amine, an organic solvent, etc. may be contained as a treatment accelerator in small amounts, say, no more than 50 wt %. Exemplary surfactants include alkylbenzenesulfonates, dialkylsulfosuccinates and polyoxyethylene alkyl ethers; exemplary amines include alkylamines such as triethylamine and alkanolamines such as monoethanolamine; and exemplary organic solvents include methyl alcohol, 1-propyl alcohol, 2-propyl alcohol, t-butyl alcohol and other organics that have good miscibility with water.

The manner in which the resin substrates are treated with the aqueous stripping solution in the method of the present invention is in no way limited and may embrace any techniques such as immersion of the substrate in a bath filled with the aqueous stripping solution, immersion of the substrate in the aqueous stripping solution in an autoclave under pressure, and continuous contact between the substrate and the aqueous stripping solution. Especially in the case of treating the substrate at elevated temperatures, superatmospheric pressure will develop and, hence, immersion in the autoclaved aqueous stripping solution is recommended. In this case, the pressure to be applied is on the order of 5 $kg/cm^2$ at a temperature of 160° C.

When the substrate having the cured coating film on the surface is to be treated with the aqueous stripping solution in the method of the present invention, the temperature to be adopted should be at least 110° C., preferably at least 140° C., but lower than the melting point of the substrate. Take, for example, the case of treating a polyolefinic substrate the temperature to be used is in the range from 110° to 170° C., preferably 150°–170° C., more preferably 150°–160° C.

The period of treatment with the aqueous stripping solution may be selected as appropriate for various factors including the type and thickness of the cured coating film to be stripped, the shape and size of the substrate to be treated and the temperature for treatment. Typically, the treatment with the aqueous stripping solution lasts for about 5 min to about 1 h, with the range from about 10 to about 40 min being preferred.

In the method of the present invention, the resin substrate which has been treated with the aqueous stripping solution to either remove the cured coating or render it to be easily removable may be subsequently treated in washing equipment to remove any residual coating film that adheres to the substrate's surface.

In the first embodiment of the present invention, the substrate which has been treated with the stripping solution may or may not be separated from the latter before the substrates are brought into contact with each other for polishing. To this end, the resin substrates in a particulate form are put into the polishing machine and a shearing force is developed between the resin substrates, between a resin substrate and the mechanical functioning means provided on the polishing machine, and between the resin substrate and the barrel (outer wall) of the polishing machine, whereby the surfaces of the substrates are polished. If desired, the substrate to be polished may preliminarily be wetted with water, an alcohol or the like.

The polishing machine to polish the substrate surfaces in the method of the present invention may be constructed in various manners similar to those of rice milling machines, such as a pestle type, a mortar spiralling type, a cylindrical friction type, an automatic circulating type and a grinding type. A particularly preferred polishing machine is of the screw feeder type that is constructed in a similar manner to an extruder of the screw feeder type which is commonly used to perform melt extrusion of resins. With this construction, the rotational force of the internal screw creates a shearing force between the resin substrates, between the resin substrate and the screw, and between the resin substrate and the barrel (outer wall), which shear force is great enough to have the surfaces of the substrates scour each other. It is preferred to adopt a screw construction and a barrel surface structure that contribute to effective creation of the necessary shear force. The polishing condition is preferably such as to produce a shearing energy of at least 0.2 kW per kg of the substrate resin.

When implementing the method of the present invention, the polishing machine of the screw feeder type is typically operated at temperatures 30°–110° C., preferably 50°–100° C., lower than the melting point of the resin substrates in order to achieve a maximum polishing effect. When treating polyolefinic substrates, the polishing step may preferably be performed at 60°–110° C.

In the second embodiment of the present invention, the resin substrate which has been treated with the aqueous stripping solution may or may not be separated from the latter before its surface is polished with an abrasive. The surface of the substrate may be polished by any suitable technique such as blasting the abrasive against the surface of the substrate in a plate form. A particularly preferred technique is by stirring both the abrasive and the substrate at high speed in polishing equipment of the high-speed vessel equipped stirrer type.

The high-speed vessel equipped stirrer that is preferably used to polish the substrate surface in the method of the present invention is equipment constructed in a similar fashion to a vessel type stirrer, such as a Henschel mixer, that is commonly used to agitate powders and particulate matter, except that the constructions of the agitating blade and baffle plate are so designed as to provide enhanced polishing effect during agitation. The concept of "high speed" means that the agitating blade rotates at speeds of at least about 1000 rpm.

In the practice of the method of the present invention, both the abrasive and the formula of a polishing solution containing the abrasive affect the ultimate polishing effect. If the particle size of the abrasive is less than 60 μm, the force of impingement is too small to provide the necessary polishing effect. If the particle size is more than 150 μm, the force of impingement is so great that the abrasive may occasionally become embedded in the resin substrate if the latter is soft. Hence, the particle size of the abrasive is preferably within the range from 80 to 120 μm. When implementing the method of the present invention, the ratio of the substrate to the abrasive is desirably in the range from 1:0.1 to 1:0.5 on a weight basis in order to achieve a maximum polishing effect.

Exemplary abrasives that can be used include an alumina powder, a peach seed powder and quartz sand, with quartz sand being preferred.

The abrasive is preferably used together with a liquid vehicle and specific examples of the liquid vehicle include an alcohol and water. The proportions of the abrasive and the liquid vehicle, when used in combination to form a polishing solution, are desirably such that the ratio of the abrasive to the liquid vehicle ranges from 2:3 to 2:6.

When implementing the method of the present invention, the temperature for the polishing treatment is desirably 50°–110° C. lower than the melting point of the resin substrate in order to provide a maximum polishing effect. If the substrate is made of a polyolefin, the temperature for the treatment lies preferably between 70° and 120° C., more preferably between 80° and 100° C.

A preferred combination of the abrasive and the liquid vehicle that may sometimes be employed to perform surface polishing consists of 0.1–0.5 kg of quartz sand and 0.4–0.8 kg of water per kg of the substrate, with the temperature selected from the range 70°–120° C.

In the third embodiment of the present invention, the resin substrate which has been treated with the aqueous stripping solution may or may not be separated from the latter before its surface is treated by a liquid honing process. The liquid honing process is a surface finishing technique in which fine abrasive particles are formulated with water to prepare a liquid polisher that is propelled at high speed against the surface to be worked. Examples of the abrasive that can be formulated in the liquid polisher include quartz sand and a peach seed powder. It is particularly preferred to use a liquid polisher that has an alumina powder of 80–200 mesh dispersed in water 2–5 times, preferably 3–5 times, the volume of the alumina powder.

If the particle size of the alumina powder is less than 200 mesh, the alumina particles in the liquid honing process will have only an insufficient energy of impingement against the resin substrate to achieve the necessary polishing effect. If the particle size of the alumina powder is more than 80 mesh, the energy of impingement is so great that the alumina particles may occasionally become embedded in the resin substrate. Hence, the particle of the alumina powder is desirably within the range from 80 to 200 mesh.

The liquid honing process is preferably performed at a propelling pressure of 2–3 kg/cm$^2$. If the propelling pressure for liquid honing is less than 2 kg/cm$^2$, the polishing effect that can be attained is almost nil. If the propelling pressure exceeds 3 kg/cm$^2$, the substrate will be attacked not only on the surface but also beneath it and, occasionally, into the deeper area. Under the circumstances, the propelling pressure is desirably within the range from 2 to 3 kg/cm$^2$.

PREFERRED EMBODIMENT

The following examples and comparative examples are provided for the purpose of further illustrating the present invention but are in no way to be taken as limiting.

Preparation of Coated Samples

In all runs, polypropylene ("Hipole X440", the trade name of Mitsui Petrochemical Industries, Ltd.; hereunder abbreviated as "PP") containing 0.5 wt % carbon black was injection molded to form rectangular sheets 3 mm thick. The sheets were treated by exposure to the vapor of 1,1,1-trichloroethane for 30 sec and thereafter left to stand at room temperature for 30 min until dry. Subsequently, the 1,1,1-trichloroethane treated surfaces of the sheets were coated with a primer ("Unistol P-801" of Mitsui Petrochemical Industries, Ltd.) by means of an air-spray gun in such a way that the thickness of the primer coat when dry would be about 10 μm. The thus applied primer coat was then set at ordinary temperature for 10 min. Thereafter, a thermosetting one-can (one-pack type) acrylic melamine paint ("Soflex #1200" of Kansai Paint Co., Ltd. ) was applied onto the primer coat on each rectangular sheet by means of an air-spray gun (discharge pressure, 1 kg/cm$^2$) in such a way that the curable coat would form in a thickness of 30–40 μm.

The thus applied paint coat was set for 10 min. Subsequently, the paint coat was cured by heating at 120° C. for 30 min to prepare coated samples each having a cured coating film formed via a primer on the surface of a PP rectangular sheet.

Removing the Coating Films on the Coated Samples

A first portion of the test pieces were ground into generally square chips having a length of around 3 mm per side and the chips were then immersed in aqueous stripping solutions having the concentrations shown in Table 1 at the temperatures for the periods also shown in Table 1. The thus treated chips were cooled to room temperature (Examples 1–13 and Comparative Examples 1–3). The sample chips thus prepared were charged into a polishing machine of the screw feeder type (a rice milling machine of Toyo Seimaiki K.K. was substituted) and a polishing treatment was conducted under the conditions shown in Table 1.

Another portion of the test pieces were similarly ground into chips, which were immersed in aqueous stripping solutions having the concentrations shown in Table 2 at the temperatures for the periods also shown in Table 2. The thus treated chips were cooled to room temperature (Examples 14–27 and Comparative Examples 3–5). The sample chips thus prepared were charged into a vessel type high-speed stirrer (a Henschel mixer was substituted) and, with the abrasive and water being added in the proportions shown in Table 2, a polishing treatment was conducted under the conditions shown in Table 2. The stirrer was rotated at a speed of 3000 rpm.

A third portion of the test pieces were similarly ground into chips, which were immersed in aqueous stripping solutions having the concentrations shown in Table 3 at the temperatures for the periods also shown in Table 3. The thus treated chips were cooled to room temperature (Examples 28–38 and Comparative Examples 6 and 7). The sample chips thus prepared were charged into liquid honing equipment (product of Fuji Seiki Kogyosho K.K.) and a liquid honing process was implemented under the conditions shown in Table 3.

Evaluating the Results of Coating Film Removal

The test pieces were stripped of the coating films by the method of the present invention and the sample chips thus treated were subjected to the following various tests to simulate their use in automobile bumpers.

(Preparing Test Specimens)

The treated sample chips were injection molded at a molding temperature of 200° C. to prepare the necessary test specimens such as rectangular sheets and disks with a thickness of 1.6 mm.

(1) Tensile tests (for tensile yield strength and tensile elongation at break)

Measurements were conducted at 23° C. in accordance with JIS K7113.

(2) High-speed areal impact strength

Disks having a thickness of 1.6 mm and a diameter of 100 mm were formed by injection molding. Each of these disks was placed on a table having a hole with a diameter of 60 mm and punched with a weight (25 mm or 1 inch in diameter) that was dropped at a speed of 2.5 m/sec. The breaking energy (in J or joules) was determined on each disk. The testing machine used was a high-speed impact tester of Orientec K.K.

With insufficient impact strength, the bumper will break upon slight crash or collision and will either damage the car body or cause a secondary accident on account of shattered resin pieces. To avoid this problem, the breaking energy must be at least 15 J and it is also necessary that the state of specimen fracture be ductile.

In the tables, the state of specimen fracture is evaluated by the following criteria:

5D : All (5) specimens experienced ductile fracture.

4D1B: Four out of the five specimens experienced ductile fracture and one experienced brittle fracture.

5B: All (5) specimens experienced brittle fracture.

(Preparing Automobile Bumpers)

The treated sample chips were injection molded on a 2000 t molding machine at a resin temperature of 250° C. to produce bumpers having the cross section shown in FIG. 1.

(3) Evaluating the external appearance of the bumpers

The external appearance of the shaped bumpers was examined visually and evaluated by the following criteria:

O: The bumper surface had no marked defects in appearance such as coarse seeding due to paint residue, asperities, waviness, deformation, warpage, sink marks, uneven luster and silver marks; the surface had satisfactory gloss and could be repainted without showing any marked external defects.

X: The bumper surface had marked external defects or it had no gloss.

(4) Impact experiment (Test method)

The bumper is mounted on a chassis or an actual car model and a pendulum as an impacting object (equivalent to the car weight) is swung against the bumper in one of two atmospheres, one at ordinary temperature and the other at −30° C.

(Evaluation)

Bumper deformation at ordinary temperature: The amount of dent created by the impacting object was measured and rated O when it was less than 60 mm and X if 60 mm or more.

Impact resistance at −30° C.: Rated O when the bumper did not break and X if broken.

(5) Overall rating of the shaped bumpers

Any specimen that was rated X in either the external examination or the impact test or both was given the overall rating X (no good).

TABLE 1

| | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| Chemical treatment | | | | | | | | | |
| •Alkali | NaOH | NaOH | NaOH | NaOH | NaOH | KOH | LiOH | NaOH | KOH |
| •Concentration (wt %) | 0.5 | 3.0 | 5.0 | 3.0 | 3.0 | 3.0 | 3.0 | 3.0 | 1.0 |

TABLE 1-continued

|  | | | | | | | | | |
|---|---|---|---|---|---|---|---|---|---|
| •Temperature (°C.) | 150 | 150 | 150 | 165 | 150 | 150 | 150 | 150 | 150 |
| •Time (min) | 15 | 15 | 15 | 15 | 10 | 15 | 15 | 15 | 10 |
| Surface polishing | | | | | | | | | |
| •Temperature (°C.) | 100 | 100 | 60 | 60 | 80 | 100 | 100 | 80 | 100 |
| •Time (min) | 30 | 30 | 30 | 30 | 30 | 30 | 30 | 30 | 30 |
| •Shear energy (KW/kg of substrate) | 1 | 2 | 0.4 | 2 | 1 | 0.5 | 0.5 | 2 | 0.5 |
| Resin properties | | | | | | | | | |
| High-speed areal impact | | | | | | | | | |
| •Breaking energy (J) | 21 | 21 | 21 | 21 | 21 | 21 | 21 | 21 | 21 |
| •Specimen fracture | 5D | 5D | 5D | 5D | 5D | 5D | 5D | 5D | 5D |
| Tensile characteristics | | | | | | | | | |
| •Tensile strength (kg/cm$^2$) | 200 | 200 | 200 | 200 | 200 | 200 | 200 | 200 | 200 |
| •Tensile elongation (%) | 90 | 90 | 90 | 90 | 90 | 90 | 90 | 90 | 90 |
| Performance of shaped bumper | | | | | | | | | |
| •Appearance | o | o | o | o | o | o | o | o | o |
| •Bumper deformation at ordinary temperature | o | o | o | o | o | o | o | o | o |
| •Impact resistance at −30° C. | o | o | o | o | o | o | o | o | o |
| Overall rating | o | o | o | o | o | o | o | o | o |

|  | Comp. Ex. 1 | Ex. 10 | Ex. 11 | Comp. Ex. 2 | Ex. 12 | Ex. 13 | Comp. Ex. 3 |
|---|---|---|---|---|---|---|---|
| Chemical treatment | | | | | | | |
| •Alkali | No treatment | NaOH | NaOH | NaOH | NaOH | NaOH | NaOH |
| •Concentration (wt %) | | 3.0 | 5.0 | 3.0 | 3.0 | 3.0 | 1.0 |
| •Temperature (°C.) | | 150 | 160 | 80 | 140 | 140 | 150 |
| •Time (min) | | 10 | 5 | 30 | 15 | 15 | 10 |
| Surface polishing | | | | | | | |
| •Temperature (°C.) | 100 | 50 | 30 | 100 | 80 | 100 | No treatment |
| •Time (min) | 30 | 30 | 30 | 30 | 30 | 30 | No treatment |
| •Shear energy (KW/kg of substrate) | 0.5 | 1 | 0.3 | 1 | 2 | 1 | — |
| Resin properties | | | | | | | |
| High-speed areal impact | | | | | | | |
| •Breaking energy (J) | 2.0 | 9.0 | 9.0 | 2.0 | 9.0 | 9.0 | 2.0 |
| •Specimen fracture | 5B | 5D | 5D | 5B | 5D | 5D | 5B |
| Tensile characteristics | | | | | | | |
| •Tensile strength (kg/cm$^2$) | 200 | 200 | 200 | 200 | 200 | 200 | 200 |
| •Tensile elongation (%) | 40 | 40 | 40 | 40 | 40 | 40 | 40 |
| Performance of shaped bumper | | | | | | | |
| •Appearance | X | o | o | X | o | o | X |
| •Bumper deformation at ordinary temperature | X | o | o | X | o | o | X |
| •Impact resistance at −30° C. | X | o | o | X | o | o | X |
| Overall rating | X | o | o | X | o | o | X |

TABLE 2

|  | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|
| Chemical treatment | | | | | | | | | |
| •Alkali | NaOH | NaOH | NaOH | NaOH | NaOH | KOH | LiOH | NaOH | KOH |
| •Concentration (wt %) | 0.5 | 3.0 | 5.0 | 3.0 | 3.0 | 3.0 | 3.0 | 3.0 | 1.0 |
| •Temperature (°C.) | 150 | 150 | 150 | 165 | 150 | 150 | 150 | 150 | 150 |
| •Time (min) | 15 | 15 | 15 | 15 | 10 | 15 | 15 | 15 | 10 |
| Surface polishing | | | | | | | | | |
| •Quartz sand/water in polish solution (wt %) | 0.3/0.5 | 0.3/0.5 | 0.2/0.5 | 0.2/0.5 | 0.3/0.5 | 0.2/0.4 | 0.3/0.5 | 0.3/0.5 | 0.3/0.5 |
| •Temperature (°C.) | 90 | 100 | 90 | 80 | 90 | 90 | 90 | 110 | 120 |

TABLE 2-continued

|  |  |  |  |  |  |  |  |  |  |
|---|---|---|---|---|---|---|---|---|---|
| •Time (min) | 20 | 20 | 20 | 20 | 30 | 30 | 20 | 20 | 20 |
| Resin properties |  |  |  |  |  |  |  |  |  |
| High-speed areal impact |  |  |  |  |  |  |  |  |  |
| •Breaking energy (J) | 21 | 21 | 21 | 21 | 21 | 21 | 21 | 21 | 21 |
| •Specimen fracture | 5D | 5D | 5D | 5D | 5D | 5D | 5D | 5D | 5D |
| Tensile characteristics |  |  |  |  |  |  |  |  |  |
| •Tensile strength (kg/cm$^2$) | 200 | 200 | 200 | 200 | 200 | 200 | 200 | 200 | 200 |
| •Tensile elongation (%) | 90 | 90 | 90 | 90 | 90 | 90 | 90 | 90 | 90 |
| Performance of shaped bumper |  |  |  |  |  |  |  |  |  |
| •Appearance | ○ | ○ | ○ | ○ | ○ | ○ | ○ | ○ | ○ |
| •Bumper deformation at ordinary temperature | ○ | ○ | ○ | ○ | ○ | ○ | ○ | ○ | ○ |
| •Impact resistance at −30° C. | ○ | ○ | ○ | ○ | ○ | ○ | ○ | ○ | ○ |
| Overall rating | ○ | ○ | ○ | ○ | ○ | ○ | ○ | ○ | ○ |

|  | Comp. Ex. 4 | Ex. 23 | Ex. 24 | Comp. Ex. 5 | Ex. 25 | Ex. 26 | Ex. 27 | Comp. Ex. 6 |
|---|---|---|---|---|---|---|---|---|
| Chemical treatment |  |  |  |  |  |  |  |  |
| •Alkali | No treatment | NaOH | NaOH | NaOH | NaOH | NaOH | NaOH | NaOH |
| •Concentration (wt %) |  | 3.0 | 5.0 | 3.0 | 3.0 | 3.0 | 3.0 | 1.0 |
| •Temperature (°C.) |  | 150 | 160 | 80 | 140 | 140 | 140 | 150 |
| •Time (min) |  | 10 | 5 | 30 | 15 | 15 | 15 | 10 |
| Surface polishing |  |  |  |  |  |  |  |  |
| •Quartz sand/water in polish solution (wt %) | 0.3/0.5 | 0.3/0.5 | 0.2/0.4 | 0.3/0.5 | 0.3/0.5 | 0.1/0.5 | 0.3/0.5 | No treatment |
| •Temperature (°C.) | 90 | 60 | 60 | 90 | 90 | 90 | 60 |  |
| •Time (min) | 20 | 20 | 20 | 20 | 20 | 20 | 20 |  |
| Resin properties |  |  |  |  |  |  |  |  |
| High-speed areal impact |  |  |  |  |  |  |  |  |
| •Breaking energy (J) | 2.0 | 9.0 | 9.0 | 2.0 | 9.0 | 9.0 | 9.0 | 2.0 |
| •Specimen fracture | 5B | 5D | 5D | 5B | 5D | 5D | 5D | 5B |
| Tensile characteristics |  |  |  |  |  |  |  |  |
| •Tensile strength (kg/cm$^2$) | 200 | 200 | 200 | 200 | 200 | 200 | 200 | 200 |
| •Tensile elongation (%) | 40 | 40 | 40 | 40 | 40 | 40 | 40 | 40 |
| Performance of shaped bumper |  |  |  |  |  |  |  |  |
| •Appearance | X | ○ | ○ | X | ○ | ○ | ○ | X |
| •Bumper deformation at ordinary temperature | X | ○ | ○ | X | ○ | ○ | ○ | X |
| •Impact resistance at −30° C. | X | ○ | ○ | X | ○ | ○ | ○ | X |
| Overall rating | X | ○ | ○ | X | ○ | ○ | ○ | X |

TABLE 3

|  | Ex. 28 | Ex. 29 | Ex. 30 | Ex. 31 | Ex. 32 | Ex. 33 | Ex. 34 | Ex. 35 | Ex. 36 |
|---|---|---|---|---|---|---|---|---|---|
| Chemical treatment |  |  |  |  |  |  |  |  |  |
| •Alkali | NaOH | NaOH | NaOH | NaOH | NaOH | KOH | LiOH | NaOH | KOH |
| •Concentration (wt %) | 0.5 | 3.0 | 5.0 | 3.0 | 3.0 | 3.0 | 3.0 | 3.0 | 1.0 |
| •Temperature (°C.) | 150 | 150 | 150 | 165 | 150 | 150 | 150 | 150 | 150 |
| •Time (min) | 15 | 15 | 15 | 15 | 10 | 15 | 15 | 15 | 10 |
| Surface polishing |  |  |  |  |  |  |  |  |  |
| •Alumina mesh size | #100 | #120 | #150 | #80 | #100 | #100 | #100 | #100 | #100 |
| •Abrasive/water in polishing solution (wt %) | 0.2/0.8 | 0.2/0.8 | 0.1/0.5 | 0.2/0.8 | 0.2/0.8 | 0.2/0.8 | 0.2/0.8 | 0.2/0.8 | 0.2/0.4 |
| •Propelling pressure (kg/cm$^2$) | 2.5 | 2.5 | 2.5 | 2.5 | 3.0 | 2.5 | 2.5 | 2.0 | 2.5 |
| •Polishing speed (m/min) | 1.0 | 1.0 | 1.0 | 1.0 | 1.0 | 1.0 | 1.0 | 1.0 | 1.0 |
| Resin properties |  |  |  |  |  |  |  |  |  |
| High-speed areal impact |  |  |  |  |  |  |  |  |  |
| •Breaking energy (J) | 21 | 21 | 21 | 21 | 21 | 21 | 21 | 21 | 21 |
| •Specimen fracture | 5D | 5D | 5D | 5D | 5D | 5D | 5D | 5D | 5D |

TABLE 3-continued

| Tensile characteristics | | | | | | | | | |
|---|---|---|---|---|---|---|---|---|---|
| •Tensile strength (kg/cm²) | 200 | 200 | 200 | 200 | 200 | 200 | 200 | 200 | 200 |
| •Tensile elongation (%) | 90 | 90 | 90 | 90 | 90 | 90 | 90 | 90 | 90 |
| Performance of shaped bumper | | | | | | | | | |
| •Appearance | o | o | o | o | o | o | o | o | o |
| •Bumper deformation at ordinary temperature | o | o | o | o | o | o | o | o | o |
| •Impact resistance at −30° C. | o | o | o | o | o | o | o | o | o |
| Overall rating | o | o | o | o | o | o | o | o | o |

| | Comp. Ex. 6 | Ex. 37 | Ex. 38 | Comp. Ex. 7 |
|---|---|---|---|---|
| Chemical treatment | | | | |
| •Alkali | No treatment | NaOH | NaOH | NaOH |
| •Concentration (wt %) | | 3.0 | 3.0 | 1.0 |
| •Temperature (°C.) | | 80 | 140 | 150 |
| •Time (min) | | 30 | 15 | 10 |
| Surface polishing | | | | |
| •Alumina mesh size | #100 | #100 | #100 | No treatment |
| •Abrasive/water in polishing solution (wt %) | 0.2/0.8 | 0.2/0.8 | 0.2/0.8 | — |
| Propelling pressure (kg/cm²) | 2.5 | 2.5 | 1.5 | — |
| •Polishing speed (m/min) | 1.0 | 1.0 | 1.0 | — |
| Resin properties | | | | |
| High-speed areal impact | | | | |
| •Breaking energy (J) | 2.0 | 9.0 | 9.0 | 2.0 |
| •Specimen fracture | 5B | 5D | 5D | 5B |
| Tensile characteristics | | | | |
| •Tensile strength (kg/cm²) | 200 | 200 | 200 | 200 |
| •Tensile elongation (%) | 40 | 40 | 40 | 40 |
| Performance of shaped bumper | | | | |
| •Appearance | X | o | o | X |
| •Bumper deformation at ordinary temperature | X | o | o | X |
| •Impact resistance at −30° C. | X | o | o | X |
| Overall rating | X | o | o | X |

In accordance with the method of the present invention, the coating films on resin substrates are stripped or rendered to be easily strippable by means of treatment with an aqueous alkali solution that can be handled with less hazard and which permit easy disposal of liquid wastes; furthermore, the surfaces of the substrates are polished by one of the three specified techniques so as to realize complete removal of the coating films from the resin substrates. The method has the added advantage that the stripped substrates can be recycled to another industrial use.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for removing a cured coating film of a thermosetting resin composition from surfaces of polyolefin resin substrates, comprising the steps of:

treating crushed particulates of polyolefin resin substrates having a particle size in a range of from 0.5 to 20 mm, in an aqueous alkali solution having a concentration of 0.2 to 4.0% by weight at a temperature of 110° C. or higher, but lower than a melting point of said substrates to obtain treated resin substrate particulates;

contacting the treated resin substrate particulates with each other, thereby removing said cured coating film from said particulates by shearing force in a screw feeder polishing machine or in a polishing machine equipped with a high-speed vessel stirrer; and recycling resulting treated particulates which have had said cured coating film removed for reuse as polyolefin resin.

2. A method according to claim 1, wherein said particulates are brought into contact with each other in a screw feeder polishing machine, with said particulates being held at a temperature of from 30° to 110° C. lower than the melting point of said substrates.

3. A method according to claim 2, wherein said particulates are brought into contact with each other in a screw feeder polishing machine with a shearing energy of at least 0.2 kW per kg of the polyolefin resin substrates.

4. A method according to claim 1, wherein said particulates are brought into contact with each other in a polishing machine equipped with a high-speed vessel stirrer in a presence of an abrasive at a temperature of from 70° to 120° C.

5. A method according to claim 4, wherein said particulates are brought into contact with each other in a polishing machine equipped with a high-speed vessel stirrer in a presence of an abrasive at a temperature of from 80° to 100° C.

6. A method according to claim 4, wherein said abrasive used for removing the cured coating is quartz sand.

7. A method according to claim 1, wherein said aqueous alkali solution is selected from at least one of NaOH and KOH aqueous solutions.

8. A method according to claim 1, wherein said treating in said aqueous alkali solution is carried out by immersing said particulates in said aqueous alkali solution at a temperature higher than 140° C.

9. A method-according to claim 1, wherein said thermosetting resin composition comprises at least one member selected from a group consisting of alkyd, acrylic, and polyester resin.

10. A method according to claim 1, wherein said substrates comprises polypropylene.

* * * * *